United States Patent
Geisner et al.

(10) Patent No.: US 9,069,381 B2
(45) Date of Patent: Jun. 30, 2015

(54) INTERACTING WITH A COMPUTER BASED APPLICATION

(75) Inventors: Kevin Geisner, Mercer Island, CA (US); Relja Markovic, Seattle, WA (US); Stephen G. Latta, Seattle, WA (US); Mark T. Mihelich, Seattle, WA (US); Christopher Willoughby, Kirkland, WA (US); Jonathan T. Steed, Redmond, WA (US); Darren Bennett, Seattle, WA (US); Shawn C. Wright, Sammamish, WA (US); Matt Coohill, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 295 days.

(21) Appl. No.: 13/410,561

(22) Filed: Mar. 2, 2012

(65) Prior Publication Data

US 2012/0165096 A1 Jun. 28, 2012

Related U.S. Application Data

(63) Continuation of application No. 12/722,594, filed on Mar. 12, 2010.

(51) Int. Cl.
*H04H 60/61* (2008.01)
*H04H 20/00* (2008.01)
(Continued)

(52) U.S. Cl.
CPC ......... *G06F 3/011* (2013.01); *A63F 2300/8088* (2013.01); *A63F 2300/1093* (2013.01);
(Continued)

(58) Field of Classification Search
CPC . A63F 13/10; A63F 2300/10; A63F 23/1087; A63F 23/1093; A63F 23/6045; A63F 23/8023; A63F 23/8088

USPC .......................................................... 463/1, 30
See application file for complete search history.

(56) References Cited

U.S. PATENT DOCUMENTS

| 4,627,620 A | 12/1986 | Yang |
| 4,630,910 A | 12/1986 | Ross et al. |

(Continued)

FOREIGN PATENT DOCUMENTS

| CN | 101254344 B | 6/2010 |
| EP | 0583061 A2 | 2/1994 |

(Continued)

OTHER PUBLICATIONS

Stevens, "Flights into Virtual Reality Treating Real World Disorders", The Washington Post, Mar. 27, 1995, Science Psychology, 2 pages.

(Continued)

*Primary Examiner* — Lawrence Galka
(74) *Attorney, Agent, or Firm* — Miia Mula; Judy Yee; Micky Minhas

(57) ABSTRACT

A computing system runs an application (e.g., video game) that interacts with one or more actively engaged users. One or more physical properties of a group are sensed. The group may include the one or more actively engaged users and/or one or more entities not actively engaged with the application. The computing system will determine that the group (or the one or more entities not actively engaged with the application) have performed a predetermined action. A runtime condition of the application is changed in response to determining that the group (or the one or more entities not actively engaged with the computer based application) have performed the predetermined action. Examples of changing a runtime condition include moving an object, changing a score or changing an environmental condition of a video game.

20 Claims, 12 Drawing Sheets

(51) Int. Cl.
*G06F 3/01* (2006.01)
*A63F 13/40* (2014.01)

(52) U.S. Cl.
CPC ......... *A63F2300/1087* (2013.01); *A63F 13/10* (2013.01); *A63F 2300/10* (2013.01); *A63F 2300/8023* (2013.01); *A63F 2300/6045* (2013.01); *G06F 3/017* (2013.01)

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 * | 2/2001 | Darrell et al. .................. 382/103 |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |

(56) References Cited

U.S. PATENT DOCUMENTS

| | | | |
|---|---|---|---|
| 7,560,701 | B2 | 7/2009 | Oggier et al. |
| 7,570,805 | B2 | 8/2009 | Gu |
| 7,574,020 | B2 | 8/2009 | Shamaie |
| 7,576,727 | B2 | 8/2009 | Bell |
| 7,590,262 | B2 | 9/2009 | Fujimura et al. |
| 7,593,552 | B2 | 9/2009 | Higaki et al. |
| 7,598,942 | B2 | 10/2009 | Underkoffler et al. |
| 7,607,509 | B2 | 10/2009 | Schmiz et al. |
| 7,620,202 | B2 | 11/2009 | Fujimura et al. |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2005/0059488 | A1* | 3/2005 | Larsen et al. ............ 463/36 |
| 2006/0258457 | A1* | 11/2006 | Brigham ............ 463/36 |
| 2007/0271518 | A1* | 11/2007 | Tischer et al. ............ 715/744 |
| 2008/0026838 | A1 | 1/2008 | Dunstan et al. |
| 2008/0091512 | A1 | 4/2008 | Marci et al. |
| 2008/0125226 | A1* | 5/2008 | Emmerson ............ 463/42 |
| 2008/0152191 | A1 | 6/2008 | Fujimura et al. |
| 2008/0262909 | A1 | 10/2008 | Li et al. |
| 2008/0311996 | A1* | 12/2008 | Belton et al. ............ 463/42 |
| 2009/0002178 | A1 | 1/2009 | Guday et al. |
| 2009/0025024 | A1* | 1/2009 | Beser et al. ............ 725/12 |
| 2009/0141933 | A1 | 6/2009 | Wagg |
| 2009/0215533 | A1* | 8/2009 | Zalewski et al. ............ 463/32 |
| 2009/0221368 | A1 | 9/2009 | Yen et al. |
| 2010/0238168 | A1* | 9/2010 | Kim et al. ............ 345/420 |
| 2011/0223994 | A1* | 9/2011 | Yerli ............ 463/31 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | WO2009059065 | 5/2009 |

OTHER PUBLICATIONS

Shivappa, et al., "Person Tracking With Audio-visual Cues Using the Iterative Decoding Framework," IEEE 5th International Conference on Advanced Video and Signal Based Surveillance, 2008, pp. 260-267.

Toyama, et al., "Probabilistic Tracking in a Metric Space," Eighth International Conference on Computer Vision, Vancouver, Canada, vol. 2, Jul. 2001, 8 pages.

Cavazza, "Emotional Input for Character-based Interactive Storytelling", Proceedings of the 8th International Conference on Autonomous Agents and Multiagent Systems, May 10-15, 2009, pp. 313-320 Budapest, Hungary.

Saari, "Emotionally Adapted Games as a Source for Positive Experiences", Proceedings of the 2nd conference on Human System Interactions in Catania, Italy, May 21-23, 2009, pp. 536-541, IEEE Press, Piscataway, NJ, USA.

Lopez, "Real-Time Emotion-Driven Music Engine", International Conference on Computational Creativity, Lisbon, Portugal, Jan. 2010.

Barras, "Sony Demos Game Controller to Track Motion and Emotion", web article, NewScientist.com, Nov. 5, 2009, 5 pages.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, Vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

(56) References Cited

OTHER PUBLICATIONS

Sheridan et al., "Virtual Reality Check", Technology Review, Oct. 1993, pp. 22-28, vol. 96, No. 7.
Stevens, "Flights into Virtual Reality Treating Real-World Disorders", Science Psychology.
"Simulation and Training", 1994, Division Incorporated.
English Machine-translation of Japanese Publication No. JP08-044490 published on Feb. 16, 1996.
Chinese Office Action dated Jan. 14, 2013, Chinese Patent Application No. 201110065936.9.

* cited by examiner

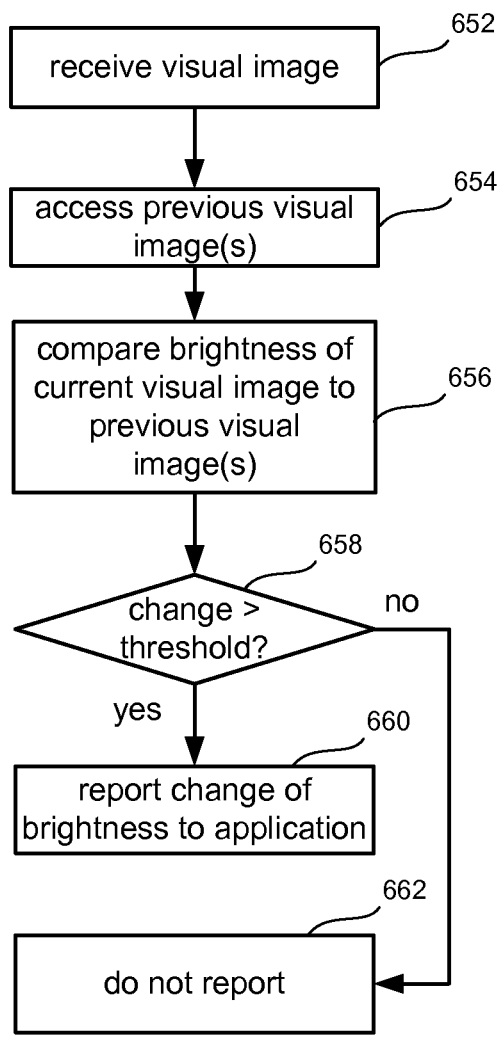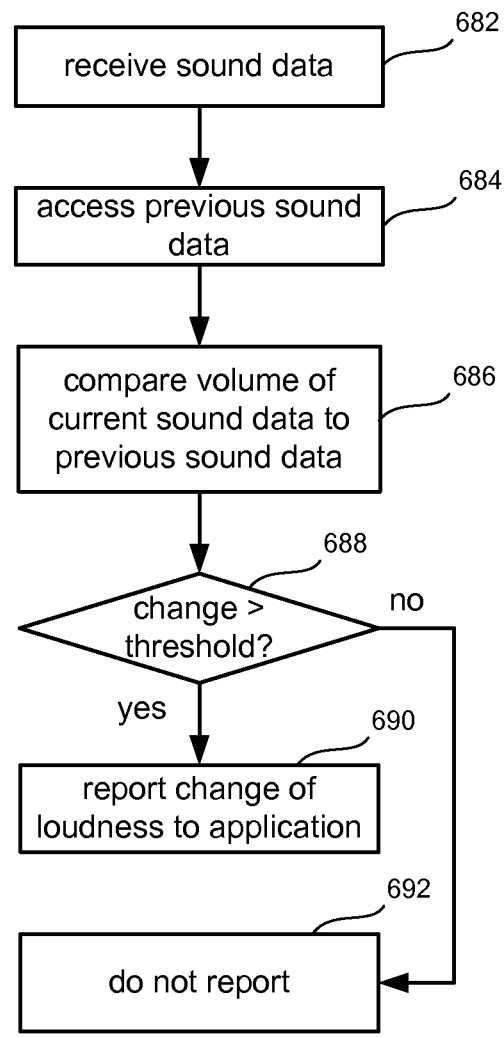

INTERACTING WITH A COMPUTER BASED APPLICATION

CLAIM OF PRIORITY

This application is a continuation application of U.S. application Ser. No. 12/722,594, "INTERACTING WITH A COMPUTER BASED APPLICATION," filed on Mar. 12, 2010, which is incorporated herein by reference in its entirety.

BACKGROUND

Video games continue to become more popular, with more households now owning video game consoles and/or personal computers running video games. While one or more people are playing a video game, it is not unusual for multiple individuals to be watching in the background. Although playing a video game can be very fun, watching a video game may not be as engaging.

SUMMARY

Technology is disclosed that allows users who are not actively engaged with the video game (e.g., not playing the game) to interact with and effect the game. This technology can be used with computer based applications other than video games.

One embodiment includes performing a computer based application including interacting with one or more actively engaged users, automatically sensing one or more physical properties of one or more entities not actively engaged with the computer based application, determining that the one or more entities not actively engaged with the computer based application have performed a predetermined action, automatically changing a runtime condition of the computer based application in response to determining that one or more entities not actively engaged with the computer based application have performed the predetermined action, and automatically reporting the changing of the runtime condition in a user interface of the computer based application.

One embodiment includes performing the computer based video game including interacting with one or more users who are bound to the computer based video game, receiving information from a first sensor about moving objects, and automatically determining and characterizing movement of the moving objects. The moving objects include the one or more bound users and one or more persons who are not bound to the computer based video game. The process also includes automatically changing the computer based video game in response to movement of the one or more bound users and one or more persons who are not bound to the computer based video game. One embodiment includes one or more processor readable storage devices having processor readable code embodied on the one or more processor readable storage devices. The processor readable code programs one or more processors to perform any of the methods described herein.

One embodiment includes a camera (or other type of sensor) and a computer connected (directly or indirectly) to the camera. The computer includes a tracking engine, a software application, a recognizer engine and a plurality of filters. The tracking engine receives data from the camera and tracks one or more moving objects based on the received data. The tracking engine provides output information indicative of tracking the one or more moving objects. The software application is in communication with the tracking engine. The software application interacts with the one or more actively engaged users based on output information from the tracking engine. The recognizer engine receives data from the camera and output information from the tracking engine and selectively provides the data from the camera and output information from the tracking engine to one or more of the filters as input data for the respective one or more filters. Each filter of the plurality of filters receives input data about movement perceptible by the camera. Each filter of the plurality of filters determines and outputs to the software application whether one or more entities not actively engaged with the software application have performed a predetermined action. The software application makes a change to a runtime condition reported in a user interface of the software application in response to the filters indicating that one or more entities not actively engaged with the software application have performed the predetermined action.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIG. 10 is a flow chart describing one embodiment of a process for identify an action or condition based on the sensed one or more physical properties.

FIG. 11 is a flow chart describing one embodiment of a process for identify an action or condition based on the sensed one or more physical properties.

DETAILED DESCRIPTION

A computing system runs an application (e.g., video game) that interacts with one or more actively engaged users. Additionally, one or more physical properties of a group of people and/or environment are sensed. The group of people may include the one or more of the actively engaged users and/or one or more entities not actively engaged with the application.

For example, the system can sense movement of people who are in the background and not playing a video game (e.g., people watching others play the game). The computing system will determine that the group (or the one or more entities not actively engaged with the application) have performed a predetermined action. A runtime condition of the application is changed in response to determining that the group (or the one or more entities not actively engaged with the computer based application) have performed the predetermined action. Examples of changing a runtime condition include moving an object, changing a score, or changing an environmental condition of a video game.

In one embodiment, a video game system (or other data processing system) tracks users and objects using depth images and/or visual images. The tracking is then used to update an application (e.g., a video game). Therefore, a user can manipulate game characters or other aspects of the application by using movement of the user's body and/or objects around the user, rather than (or in addition to) using controllers, remotes, keyboards, mice, or the like. For example, a video game system will update the position of images displayed in the video based on the new positions of the objects or update an avatar based on motion of the user. If people in the room who are not playing the game perform certain gestures, make various motions or emit certain sounds, the video game will react to the gestures, motions and/or sounds of the people in the room who are not playing the game by making a change to the game.

Although the examples below include a video game system, the technology described herein also applies to other types of data processing systems and/or other types of applications.

Figure 1A:
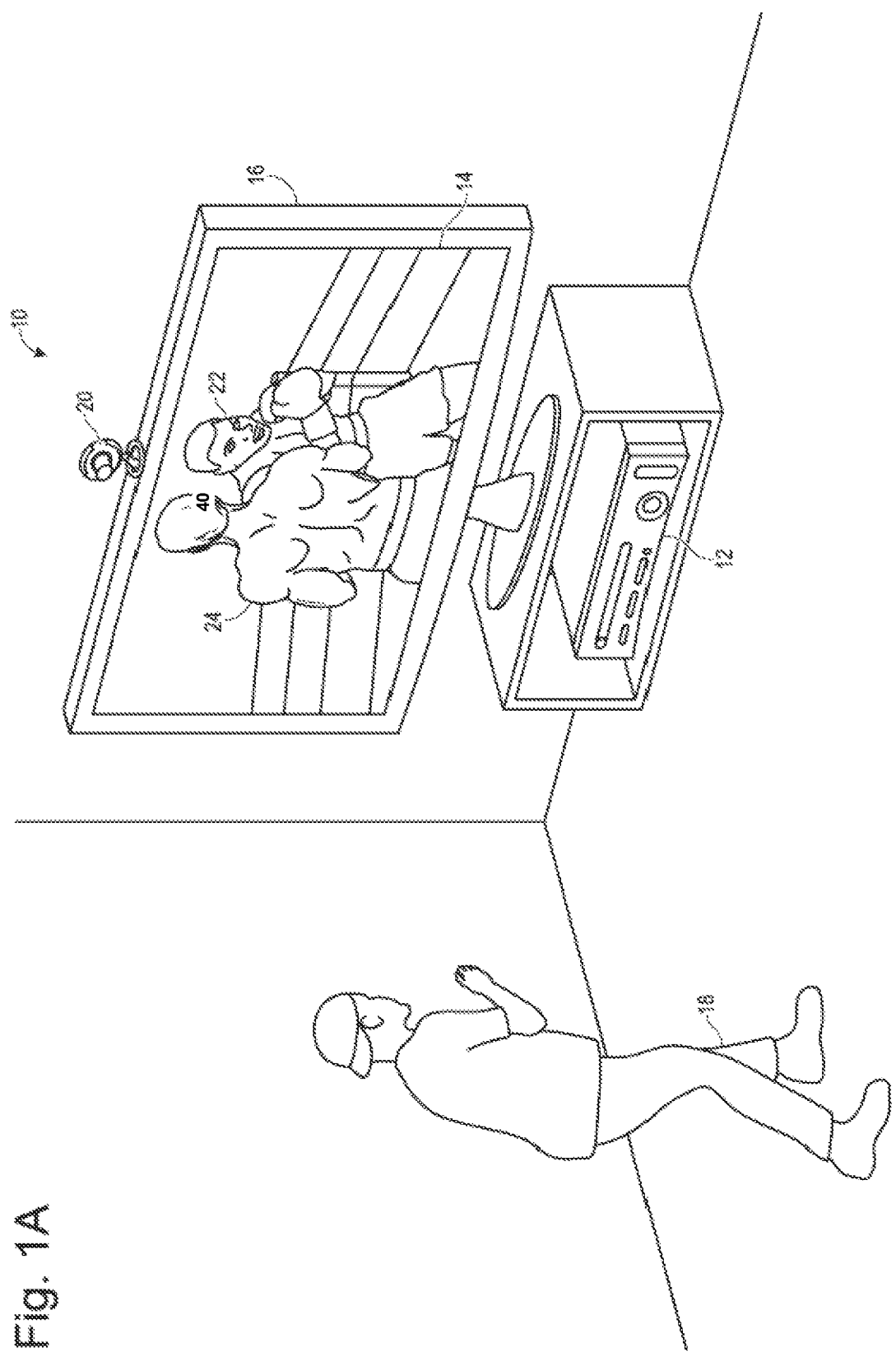
FIGS. 1A and 1B illustrate an example embodiment of a tracking system with a user playing a game.
Figure 1B:
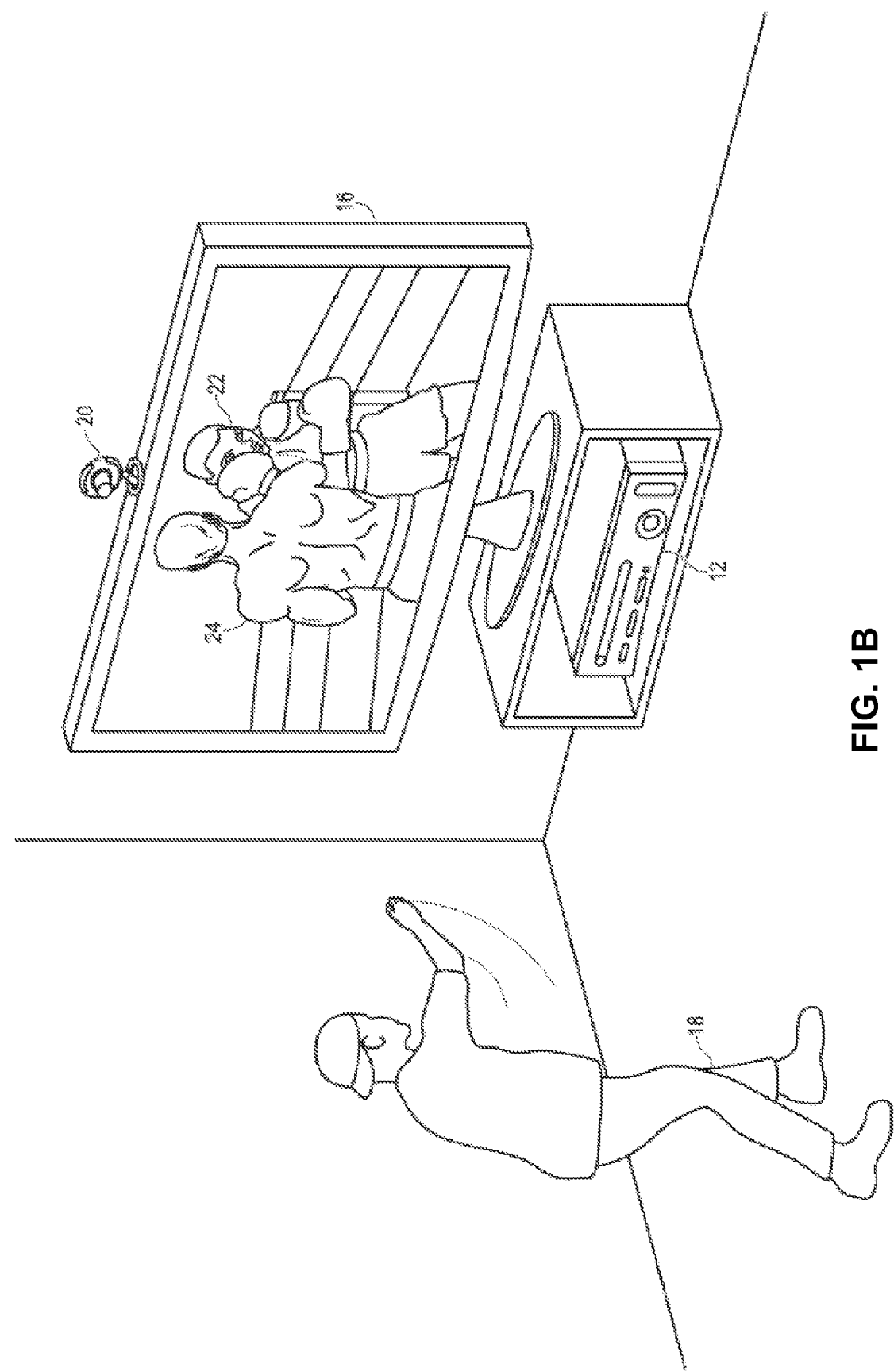

FIGS. 1A and 1B illustrate an example embodiment of a system 10 with a user 18 playing a boxing game. In an example embodiment, the system 10 may be used to recognize, analyze, and/or track a human target such as the user 18 or other objects within range of tracking system 10.

As shown in FIG. 1A, tracking system 10 may include a computing system 12. The computing system 12 may be a computer, a gaming system or console, or the like. According to an example embodiment, the computing system 12 may include hardware components and/or software components such that computing system 12 may be used to execute applications such as gaming applications, non-gaming applications, or the like. In one embodiment, computing system 12 may include a processor such as a standardized processor, a specialized processor, a microprocessor, or the like that may execute instructions stored on a processor readable storage device for performing the processes described herein.

As shown in FIG. 1A, tracking system 10 may further include a capture device 20. The capture device 20 may be, for example, a camera that may be used to visually monitor one or more users, such as the user 18, such that gestures and/or movements performed by the one or more users may be captured, analyzed, and tracked to perform one or more controls or actions within the application and/or animate an avatar or on-screen character, as will be described in more detail below.

According to one embodiment, the tracking system 10 may be connected to an audio/visual device 16 such as a television, a monitor, a high-definition television (HDTV), or the like that may provide game or application visuals and/or audio to a user such as the user 18. For example, the computing system 12 may include a video adapter such as a graphics card and/or an audio adapter such as a sound card that may provide audio/visual signals associated with the game application, non-game application, or the like. The audio/visual device 16 may receive the audio/visual signals from the computing system 12 and may then output the game or application visuals and/or audio associated with the audio/visual signals to the user 18. According to one embodiment, the audio/visual device 16 may be connected to the computing system 12 via, for example, an S-Video cable, a coaxial cable, an HDMI cable, a DVI cable, a VGA cable, component video cable, or the like.

As shown in FIGS. 1A and 1B, the tracking system 10 may be used to recognize, analyze, and/or track a human target such as the user 18. For example, the user 18 may be tracked using the capture device 20 such that the gestures and/or movements of user 18 may be captured to animate an avatar or on-screen character and/or may be interpreted as controls that may be used to affect the application being executed by computer environment 12. Thus, according to one embodiment, the user 18 may move his or her body to control the application and/or animate the avatar or on-screen character. Similarly, tracking system 10 may be used to recognize, analyze, and/or track persons who are watching user 18 play the game so that movement by those persons watching user 18 play the game will control movement avatars in the audience at the boxing game displayed on audio/visual device 16.

In the example depicted in FIGS. 1A and 1B, the application executing on the computing system 12 may be a boxing game that the user 18 is playing. For example, the computing system 12 may use the audio/visual device 16 to provide a visual representation of a boxing opponent 22 to the user 18. The computing system 12 may also use the audio/visual device 16 to provide a visual representation of a user avatar 24 that the user 18 may control with his or her movements. For example, as shown in FIG. 1B, the user 18 may throw a punch in physical space to cause the user avatar 24 to throw a punch in game space. Thus, according to an example embodiment, the computer system 12 and the capture device 20 recognize and analyze the punch of the user 18 in physical space such that the punch may be interpreted as a game control of the user avatar 24 in game space and/or the motion of the punch may be used to animate the user avatar 24 in game space.

Other movements by the user 18 may also be interpreted as other controls or actions and/or used to animate the user avatar, such as controls to bob, weave, shuffle, block, jab, or throw a variety of different power punches. Furthermore, some movements may be interpreted as controls that may correspond to actions other than controlling the user avatar 24. For example, in one embodiment, the user may use movements to end, pause, or save a game, select a level, view high scores, communicate with a friend, etc. According to another embodiment, the user may use movements to select the game or other application from a main user interface. Thus, in example embodiments, a full range of motion of the user 18 may be available, used, and analyzed in any suitable manner to interact with an application.

In example embodiments, the human target such as the user 18 may have an object. In such embodiments, the user of an electronic game may be holding the object such that the motions of the user and the object may be used to adjust and/or control parameters of the game. For example, the motion of a user holding a racket may be tracked and utilized for controlling an on-screen racket in an electronic sports game. In another example embodiment, the motion of a user holding an object may be tracked and utilized for controlling an on-screen weapon in an electronic combat game. Objects not held by the user can also be tracked, such as objects thrown, pushed or rolled by the user (or a different user) as well as self propelled objects. In addition to boxing, other games can also be implemented.

According to other example embodiments, the tracking system 10 may further be used to interpret target movements as operating system and/or application controls that are outside the realm of games. For example, virtually any controllable aspect of an operating system and/or application may be controlled by movements of the target such as the user 18.

Figure 2:
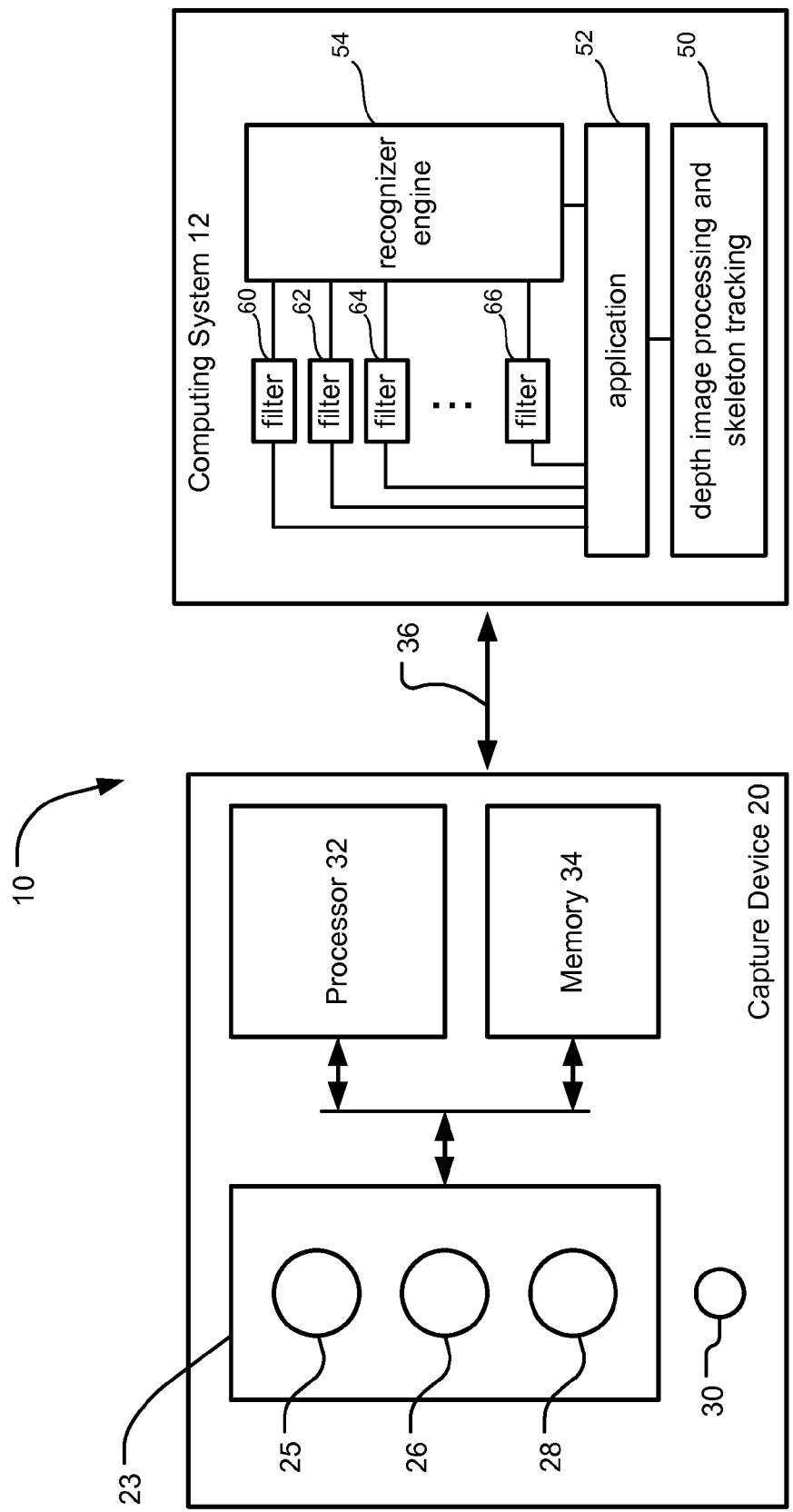
FIG. 2 illustrates an example embodiment of a capture device that may be used as part of the tracking system.

FIG. 2 illustrates an example embodiment of the capture device 20 that may be used in the tracking system 10. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight.

As shown in FIG. 2, the capture device 20 may include an image camera component 23. According to an example embodiment, the image camera component 23 may be a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

As shown in FIG. 2, according to an example embodiment, the image camera component 23 may include an infra-red (IR) light component 25, a three-dimensional (3-D) camera 26, and an RGB camera 28 that may be used to capture the depth image of a scene. For example, in time-of-flight analysis, the IR light component 25 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern, a stripe pattern, or different pattern) may be projected onto the scene via, for example, the IR light component 25. Upon striking the surface of one or more targets or objects in the scene, the pattern may become deformed in response. Such a deformation of the pattern may be captured by, for example, the 3-D camera 26 and/or the RGB camera 28 (and/or other sensor) and may then be analyzed to determine a physical distance from the capture device to a particular location on the targets or objects. In some implementations, the IR Light component 25 is displaced from the cameras 24 and 26 so triangulation can be used to determined distance from cameras 26 and 28. In some implementations, the capture device 20 will include a dedicated IR sensor to sense the IR light, or a sensor with an IR filter.

According to another embodiment, the capture device 20 may include two or more physically separated cameras that may view a scene from different angles to obtain visual stereo data that may be resolved to generate depth information. Other types of depth image sensors can also be used to create a depth image.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing system 12 in the target recognition, analysis, and tracking system 10. Additionally, the microphone 30 may be used to receive audio signals that may also be provided by to computing system 12.

In an example embodiment, the capture device 20 may further include a processor 32 that may be in communication with the image camera component 23. The processor 32 may include a standardized processor, a specialized processor, a microprocessor, or the like that may execute instructions including, for example, instructions for receiving a depth image, generating the appropriate data format (e.g., frame) and transmitting the data to computing system 12.

The capture device 20 may further include a memory component 34 that may store the instructions that are executed by processor 32, images or frames of images captured by the 3-D camera and/or RGB camera, or any other suitable information, images, or the like. According to an example embodiment, the memory component 34 may include random access memory (RAM), read only memory (ROM), cache, flash memory, a hard disk, or any other suitable storage component. As shown in FIG. 2, in one embodiment, memory component 34 may be a separate component in communication with the image capture component 23 and the processor 32. According to another embodiment, the memory component 34 may be integrated into processor 32 and/or the image capture component 23.

As shown in FIG. 2, capture device 20 may be in communication with the computing system 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing system 12 may provide a clock to the capture device 20 that may be used to determine when to capture, for example, a scene via the communication link 36. Additionally, the capture device 20 provides the depth information and visual (e.g., RGB) images captured by, for example, the 3-D camera 26 and/or the RGB camera 28 to the computing system 12 via the communication link 36. In one embodiment, the depth images and visual images are transmitted at 30 frames per second. The computing system 12 may then use the model, depth information, and captured images to, for example, control an application such as a game or word processor and/or animate an avatar or on-screen character.

Computing system 12 includes depth image processing and skeletal tracking module 50, which uses the depth images to track one or more persons detectable by the depth camera. Depth image processing and skeletal tracking module 50 provides the tracking information to application 52, which can be a video game, productivity application, communications application or other software application, etc. The audio data and visual image data is also provided to application 52 and depth image processing and skeletal tracking module 50. Application 52 provides the tracking information, audio data and visual image data to recognizer engine 54. In another embodiment, recognizer engine 54 receives the tracking information directly from depth image processing and skeletal tracking module 50 and receives the audio data and visual image data directly from capture device 20. Recognizer engine 54 is associated with a collection of filters 60, 62, 64, . . . , 66, each comprising information concerning a gesture or other action or event that may be performed by any person or object detectable by capture device 20. For example, the data from capture device 20 may be processed by the filters 60, 62, 64, . . . , 66 to identify when a user or group of users has performed one or more gestures or other actions. Those gestures may be associated with various controls, objects or conditions of application 52. Thus, the computing environment 12 may use the recognizer engine 54, with the filters, to interpret movements.

Capture device 20 of FIG. 2 provides RGB images (or visual images in other formats or color spaces) and depth images to computing system 12. A depth image may be a plurality of observed pixels where each observed pixel has an observed depth value. For example, the depth image may include a two-dimensional (2-D) pixel area of the captured scene where each pixel in the 2-D pixel area may have a depth value such as distance of an object in the captured scene from the capture device.

Figure 3:
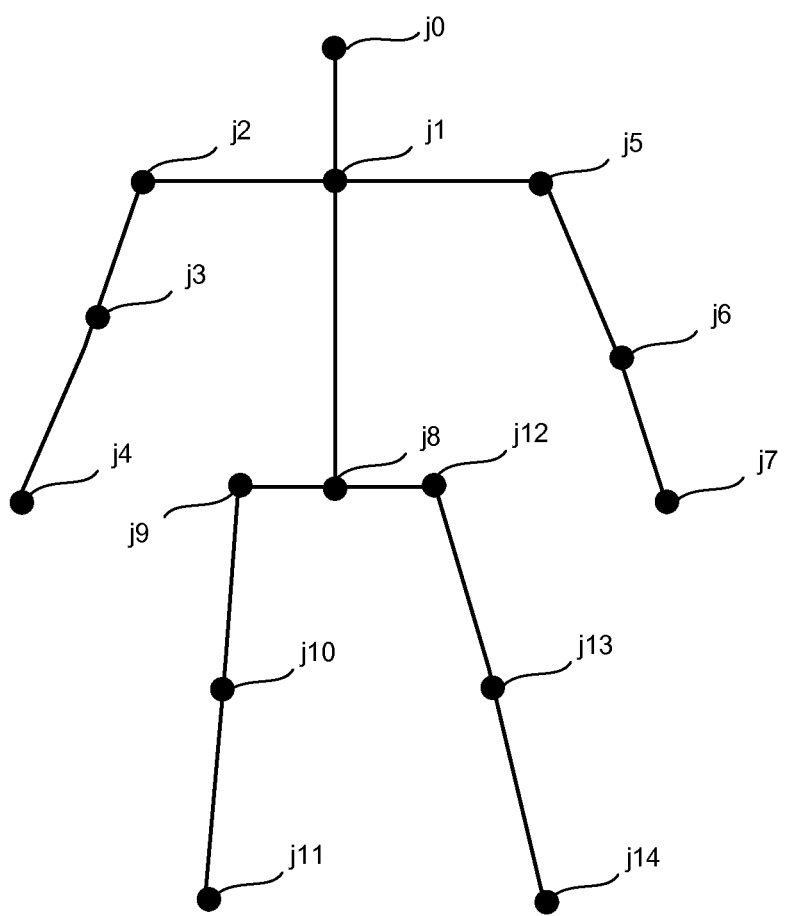
FIG. 3 depicts an example of a skeleton.

The system will use the RGB images and depth images to track a user's movements. For example, the system will track a skeleton of a person using a depth images. There are many methods that can be used to track the skeleton of a person using depth images. One suitable example of tracking a skeleton using depth images is provided in U.S. patent application Ser. No. 12/603,437, "Pose Tracking Pipeline," filed on Oct. 21, 2009. (hereinafter referred to as the '437 Application), incorporated herein by reference in its entirety. The process of the '437 Application includes acquiring a depth image, down sampling the data, removing and/or smoothing high variance noisy data, identifying and removing the background, and assigning each of the foreground pixels to different parts of the body. Based on those steps, the system will fit a model with the data and create a skeleton. The skeleton will include a set of joints and connections between the joints. FIG. 3 shows an example skeleton with 15 joints (j0, j1, j2, j3, j4, j5, j6, j7, j8, j9, j10, j11, j12, j13, and j14). Each of the joints represents a place in the skeleton where the skeleton can pivot in the x, y, z directions or a place of interest on the body. Other methods for tracking can also be used. Suitable tracking technology is also disclosed in U.S. patent application Ser. No. 12/475,308, "Device for Identifying and Tracking Multiple Humans Over Time," filed on May 29, 2009, incorporated herein by reference in its entirety; U.S. patent application Ser. No. 12/696,282, "Visual Based Identity Tracking," filed on Jan. 29, 2010, incorporated herein by reference in its entirety; U.S. patent application Ser. No. 12/641,788, "Motion Detection Using Depth Images," filed on Dec. 18, 2009, incorporated herein by reference in its entirety; and U.S. patent application Ser. No. 12/575,388, "Human Tracking System," filed on Oct. 7, 2009, incorporated herein by reference in its entirety.

Gesture recognizer engine 54 (of computing system 12 depicted in FIG. 2) is associated with multiple filters 60, 62, 64, . . . , 66 to identify a gesture or action. A filter comprises information defining a gesture, action or condition along with parameters, or metadata, for that gesture, action or condition. For instance, a throw, which comprises motion of one of the hands from behind the rear of the body to past the front of the body, may be implemented as a gesture comprising information representing the movement of one of the hands of the user from behind the rear of the body to past the front of the body, as that movement would be captured by the depth camera. Parameters may then be set for that gesture. Where the gesture is a throw, a parameter may be a threshold velocity that the hand has to reach, a distance the hand must travel (either absolute, or relative to the size of the user as a whole), and a confidence rating by the recognizer engine that the gesture occurred. These parameters for the gesture may vary between applications, between contexts of a single application, or within one context of one application over time. In one embodiment, a filter has a number of inputs and a number of outputs.

Filters may be modular or interchangeable so that a first filter may be replaced with a second filter that has the same number and types of inputs and outputs as the first filter without altering any other aspect of the recognizer engine architecture. For instance, there may be a first filter for driving that takes as input skeletal data and outputs a confidence that the gesture associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, like angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

Gesture recognizer engine 54 provides functionality to the filters. In one embodiment, the functionality that the recognizer engine 54 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

Filters 60, 62, 64, . . . , 66 are loaded and implemented on top of recognizer engine 54 and can utilize services provided by recognizer engine 54 to all filters 60, 62, 64, . . . 66. In one embodiment, recognizer engine 54 receives data to determine whether it meets the requirements of any filter 60, 62, 64, . . . , 66. Since these provided services, such as parsing the input, are provided once by recognizer engine 54, rather than by each filter 60, 62, 64, . . . , 66, such a service need only be processed once in a period of time as opposed to once per filter for that period so the processing required to determine gestures is reduced.

Application 52 may use the filters 60, 62, 64, . . . , 66 provided by the recognizer engine 54, or it may provide its own filters which plugs into recognizer engine 54. In one embodiment, all filters have a common interface to enable this plug-in characteristic. Further, all filters may utilize parameters, so a single gesture tool below may be used to debug and tune the entire filter system.

More information about recognizer engine 54 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009. Both of which are incorporated by reference herein in their entirety.

Figure 4:
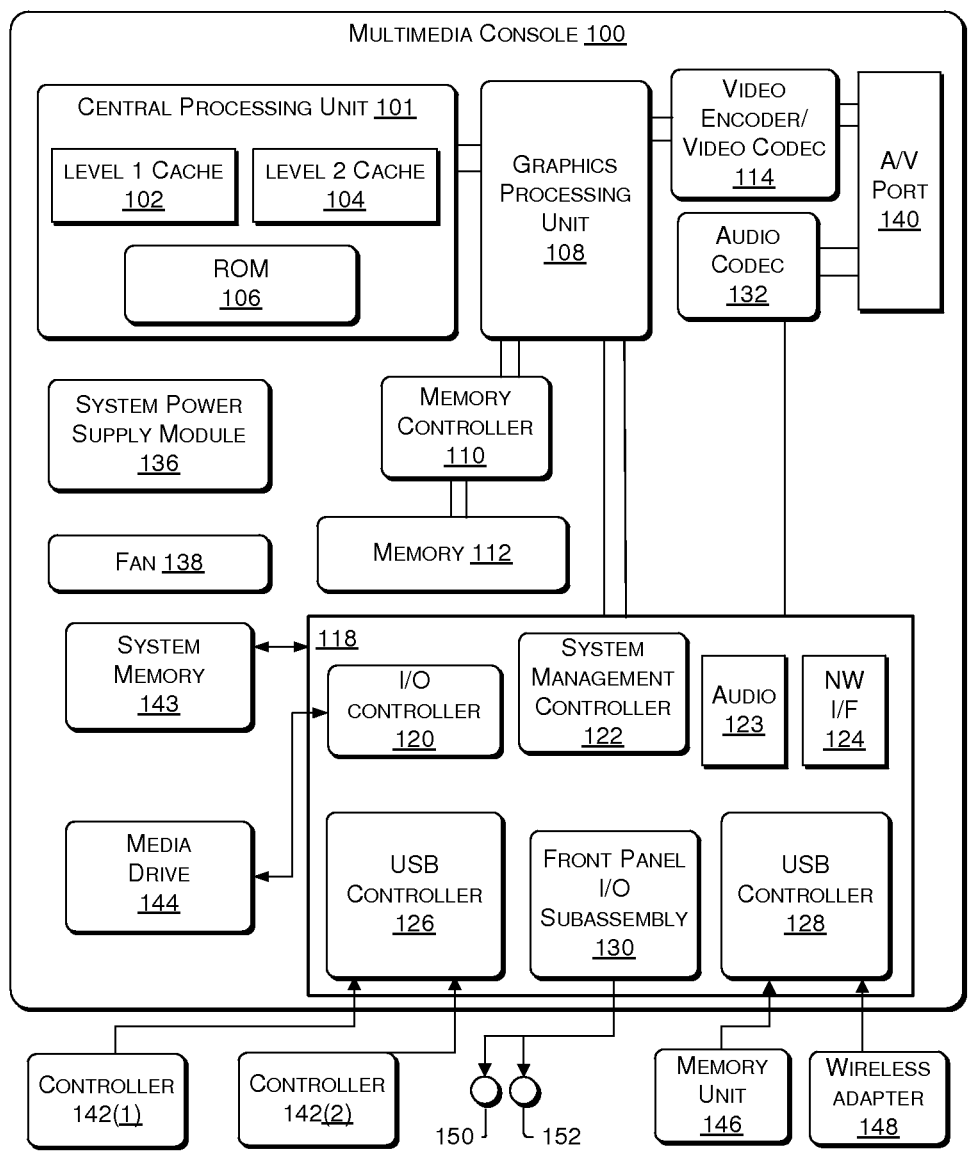
FIG. 4 illustrates an example embodiment of a computing system that may be used to track motion and update an application based on the tracked motion.

FIG. 4 illustrates an example embodiment of a computing system that may be the computing system 12 shown in FIGS. 1A-2 used to track motion and/or animate (or otherwise update) an avatar or other on-screen object displayed by an application. The computing system such as the computing system 12 described above with respect to FIGS. 1A-2 may be a multimedia console 100, such as a gaming console. As shown in FIG. 4, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, Blu-Ray drive, hard disk drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio user or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100 via USB controller 126 or other interface.

Figure 5:
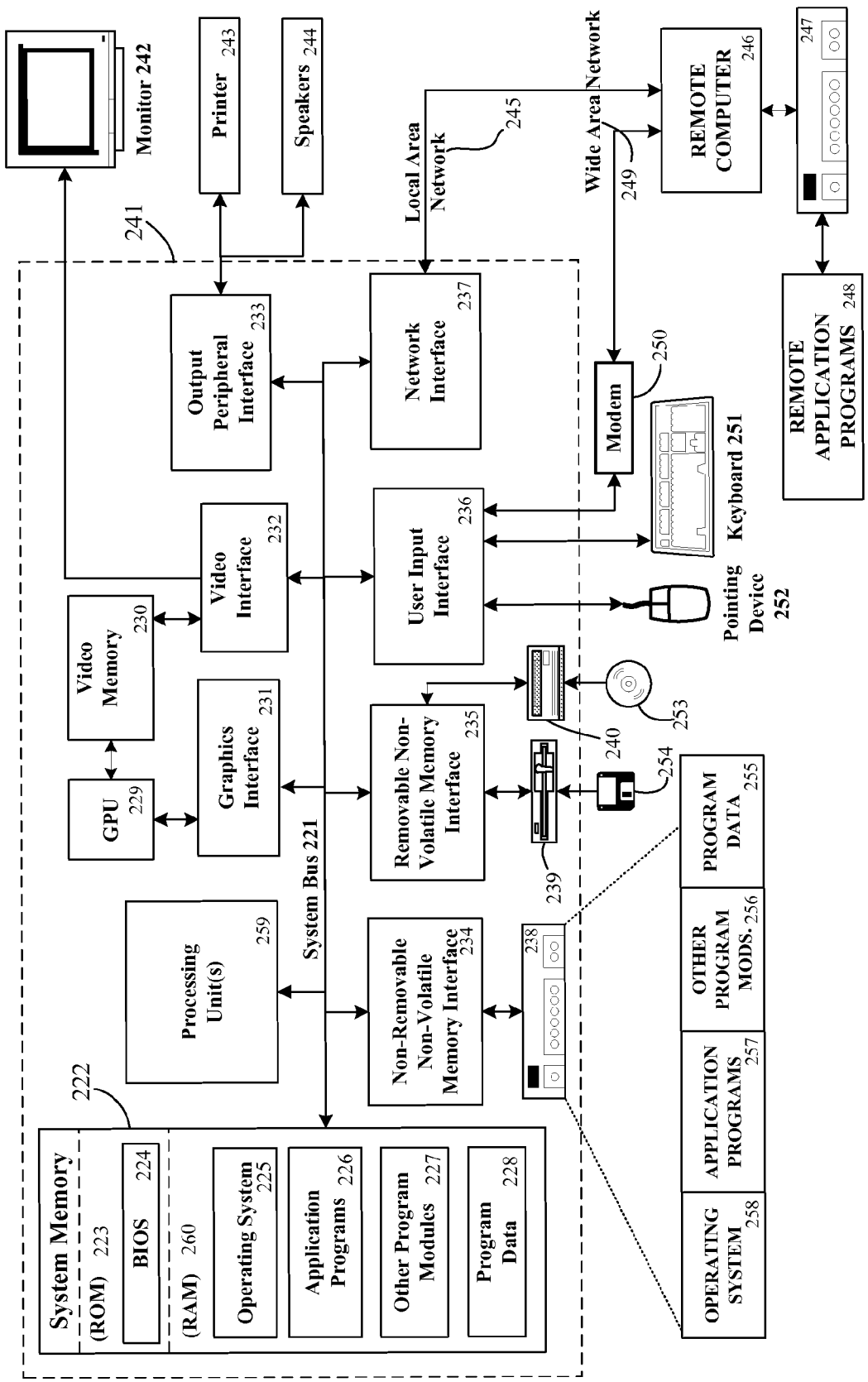
FIG. 5 illustrates another example embodiment of a computing system that may be used to track motion and update an application based on the tracked motion.

FIG. 5 illustrates another example embodiment of a computing system 220 that may be used to implement the computing system 12 shown in FIGS. 1A-2 to track motion and/or animate (or otherwise update) an avatar or other on-screen object displayed by an application. The computing system environment 220 is only one example of a suitable computing system and is not intended to suggest any limitation as to the scope of use or functionality of the presently disclosed subject matter. Neither should the computing system 220 be interpreted as having any dependency or requirement relating to any one or combination of components illustrated in the exemplary operating system 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing system 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 5, provide storage of computer readable instructions, data structures, program modules and other data for the computer 241. In FIG. 5, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100 that connect via user input interface 236. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233. Capture Device 20 may connect to computing system 220 via output peripheral interface 233, network interface 237, or other interface.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 5. The logical connections depicted include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 5 illustrates application programs 248 as residing on memory device 247. It will be appreciated that the network connections shown are exemplary and other means of establishing a communications link between the computers may be used.

Either of the systems of FIG. 4 or 5, or a different computing system, can be used to implement Computing System 12 of FIG. 2. As explained above, computing system 12 determines the motions of the users and employs those detected motions to control a video game or other application. For example, a user's motions can be used to control an avatar and/or object in a video game. In some embodiments, the system can simultaneously track multiple users and allow the motion of multiple users to control or effect the application.

In one embodiment, in order for a user's motion to be used to control an application the user must first be enrolled or bound to the application. For example, when playing a video game, a system may ask how many users will be playing that game. After the users respond with the number of users, the system will ask each user to identify himself or herself. In one embodiment, each user will be asked to identify himself or herself by standing in front of the system so that depth images and/or visual images can be obtained from multiple angles for that user. For example, the user may be asked to stand in front of the camera, turn around, and make various poses while depth images and visual images are obtained. After the system obtains enough depth and/or visual images, the system will create a set of identifying data from the images that uniquely identifies the user. The system will create a unique identification and associate that unique identification with an entity (e.g., avatar) or other object in the game/application. After a user is enrolled in (or bound to) the application, the system will track the motion of that user while the user is actively engaged with the application (e.g., playing the game or using the application). However, in the past, other people in the room who are not actively engaged with the application, (e.g., not bound to application, bound to application but not playing current game, or bound to application but currently not having a turn to play) do not have a way to interact with the application.

Figure 6:
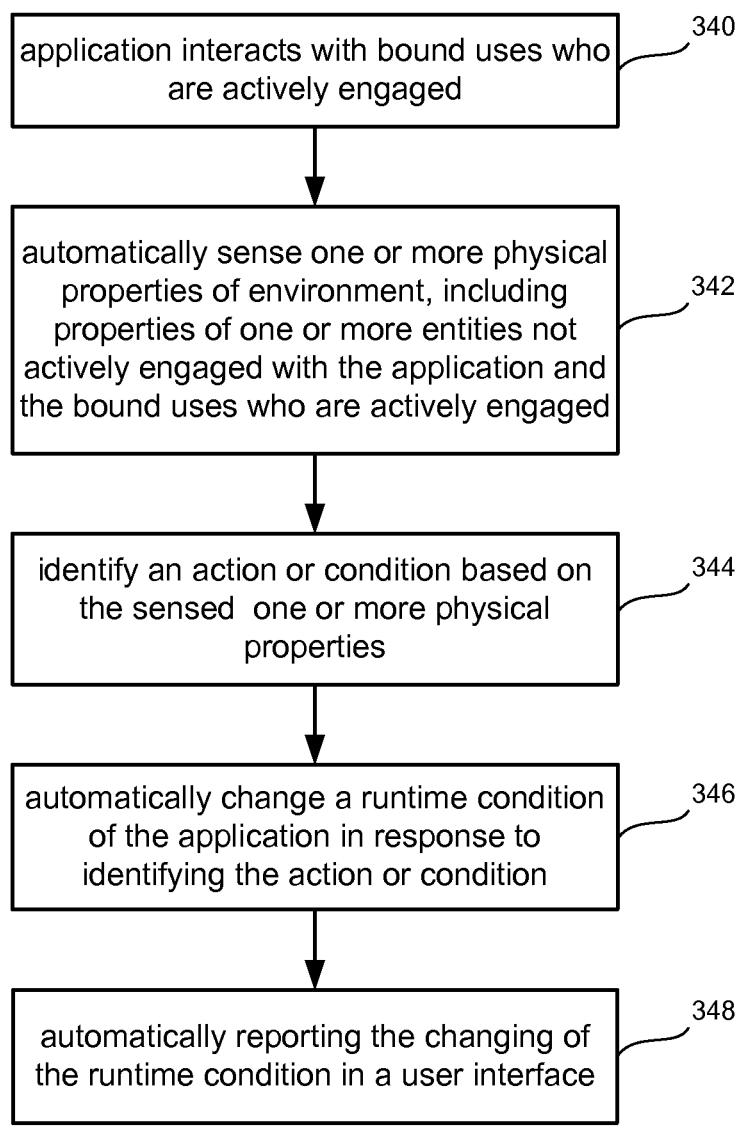
FIG. 6 is a flow chart describing one embodiment of a process for interacting with a computer based application.

FIG. 6 is a flow chart describing one embodiment of a process for running/implementing an application that allows people who are not actively engaged with the application to interact with the application. In step 340 of FIG. 6, application 52 interacts with one or more bound users who are actively engaged with application 52. Computing system 12 will sense, detect and compute the movement of various users and that movement will be used to control a video game or other type of application. For example, a user's movement can be used to control an avatar. Alternatively, a game controller can be used to control an avatar.

In step 342 of FIG. 6, the system will automatically sense one or more physical properties of the environment that is detectable by capture device 20. This includes detecting one or more properties of one or more entities that are bound users who are actively engaged with application 52, sensing one or more properties of one or more entities that are not actively engaged with application 52, and/or other environmental conditions (e.g. lighting, movement of objects, etc.). In step 344, the system will identify that an action occurred or condition exists based on the sensed one or more physical properties from step 342.

In step 346, the system will automatically change a run time condition of application 52 in response to identifying the action or condition in step 344. For example, the system will determine that one or more persons in the room had made a specific motion or performed a specific action. In response to that motion or action, the system will change something about the game. Examples of changes to the game or application that may be made in response to recognizing an action or condition include (but at not limited to) changing the score of one of the users based on the level of cheering or movement of the group of people in the background, changing background conditions (e.g., weather or lighting) in the environment based on background conditions (e.g., lighting or movement) in the room, moving an avatar or other object in response to movement of persons in the room (e.g., if one or more bound users are playing a video game that involves transport on a boat and a number of background persons in the room stand up, this may cause the boat to rock in the video game), changing the ability of an avatar (e.g., increasing the power of a hitter or boxer) in a video game due to movement or conditions (e.g., volume of cheering) in the background of the persons playing the game, etc. Alternatively, crowd noise in a video game can be proportional to noise in the room of the people playing the video game. In another alternative, crowd noise in the video game can be responsive to emotions detected in one or more persons sitting or standing in the background of a user playing the video game. In a non-video game example, the brightness of the user interface can change based on brightness in the room or distance of one or more persons from capture device 20. Alternatively, font size can change in response to persons approaching or walking away from capture device 20.

In step 348 of FIG. 6, the change to application 52 will be reported in a user interface for application 52. For example, if the score changes, the score will be updated in the user interface. If any of the objects in the video game move or otherwise change appearance, that change of appearance will be depicted in the user interface of the video game. Similarly, font size or brightness can change in the user interface for application 52. In other embodiments, the change in the application could also be reported via e-mail, text message, printout, speaker, etc.

The order of the steps depicted in FIG. 6 is one only possible example. The steps of FIG. 6 can also be performed in other orders. Additionally, many of the steps can be performed concurrently. For example, step 340, which includes the application interacting with bound users, can occur over a prolonged time during which steps 342-348 are performed repeatedly.

Figure 7:
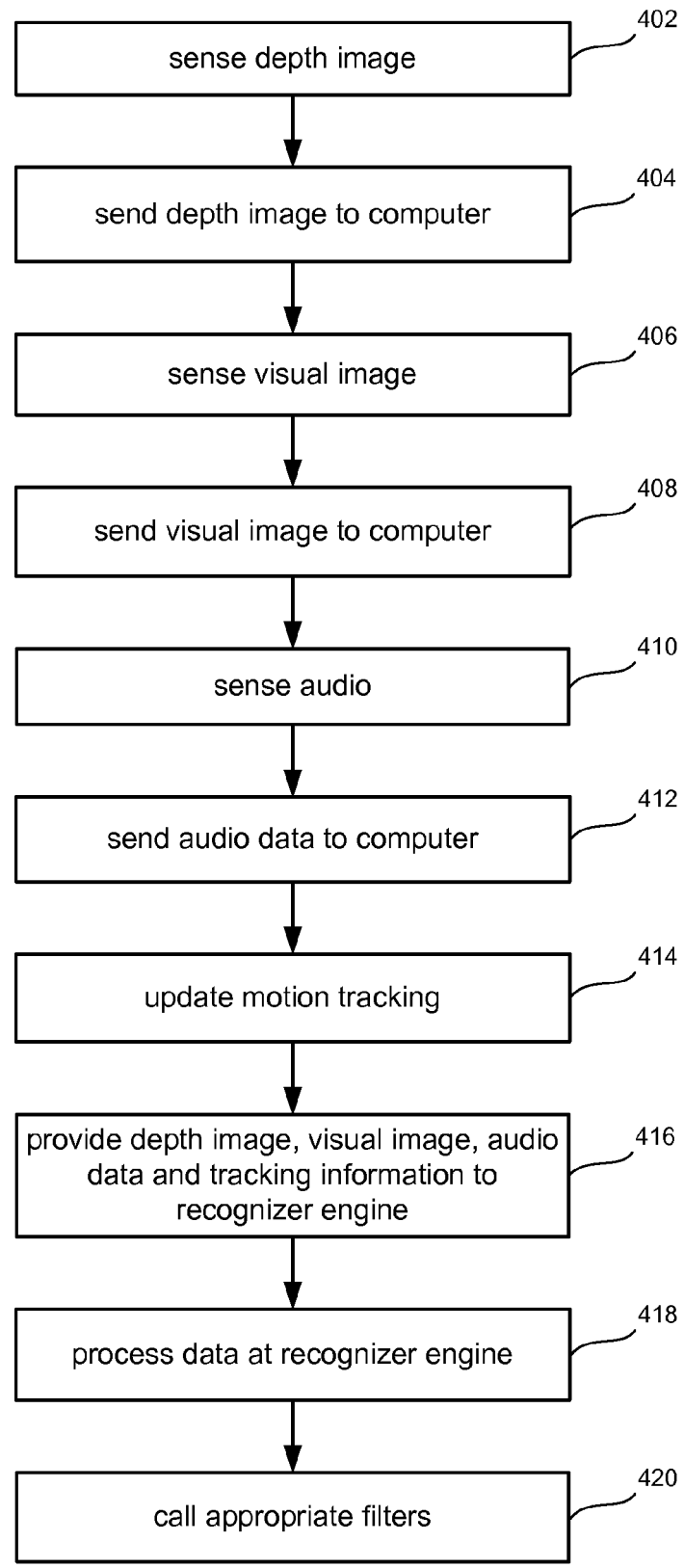
FIG. 7 is a flow chart describing one embodiment of a process for automatically sensing one or more physical properties of environment.

FIG. 7 is a flow chart describing one embodiment for automatically sensing one or more physical properties of an environment, including properties of one or more entities not actively engaged with the application and bound users who are actively engaged. The process of FIG. 7 is one example implementation of step 342 of FIG. 6. In step 402 of FIG. 7, capture device 20 will sense a depth image. In step 404, that depth image will be sent to computing system 12. In step 406, capture device 20 will sense a visual image. In step 408, that visual image will be sent to computing system 12. In step 410, capture device 20 will sense audio data. In step 412, that audio data will be sent to computing system 12. In step 414, depth image processing and skeleton tracking 50 will update the motion tracking based on the depth image, visual image and/or audio data. In step 416, the depth image, visual image and/or audio data, as well as tracking information, will be provided to recognizer engine 54. In step 418, recognizer engine 54 will process the received data and then call the appropriate one or more filters in step 420.

Looking back to FIG. 6, step 344 includes identifying an action or condition based on the sensed one or more physical properties from step 342. In one embodiment, step 344 is performed by filters 60, 62, 64, . . . , 66 (see FIG. 2). In one example, for each action that an application wishes to detect, there will be a separate filter. In other implementations, one filter can determine more than one gesture or action. As explained with respect to FIG. 7, recognizer engine 54 will receive data throughout the performance of an application. Each filter that is employed will register with recognizer engine 54, including indicating which data it is looking for. When recognizer engine 54 sees that the data for a particular filter is available, recognizer engine 54 will call the appropriate filter (step 420 of FIG. 7). It is possible that many filters are called concurrently or in an overlapping manner. Each of the filters that are called by recognizer engine 54 to look for a specific set of one or more gestures or actions will automatically identify an action or condition based on the physical properties sensed. When a filter determines that a specific gesture or action it is looking for has occurred, the filter will report that information to application 52. FIGS. 8-12 are flow charts describing the operation of various filters 60, 62, 64, . . . , 66 which can be used to implement step 344 of FIG. 6.

Figure 8:
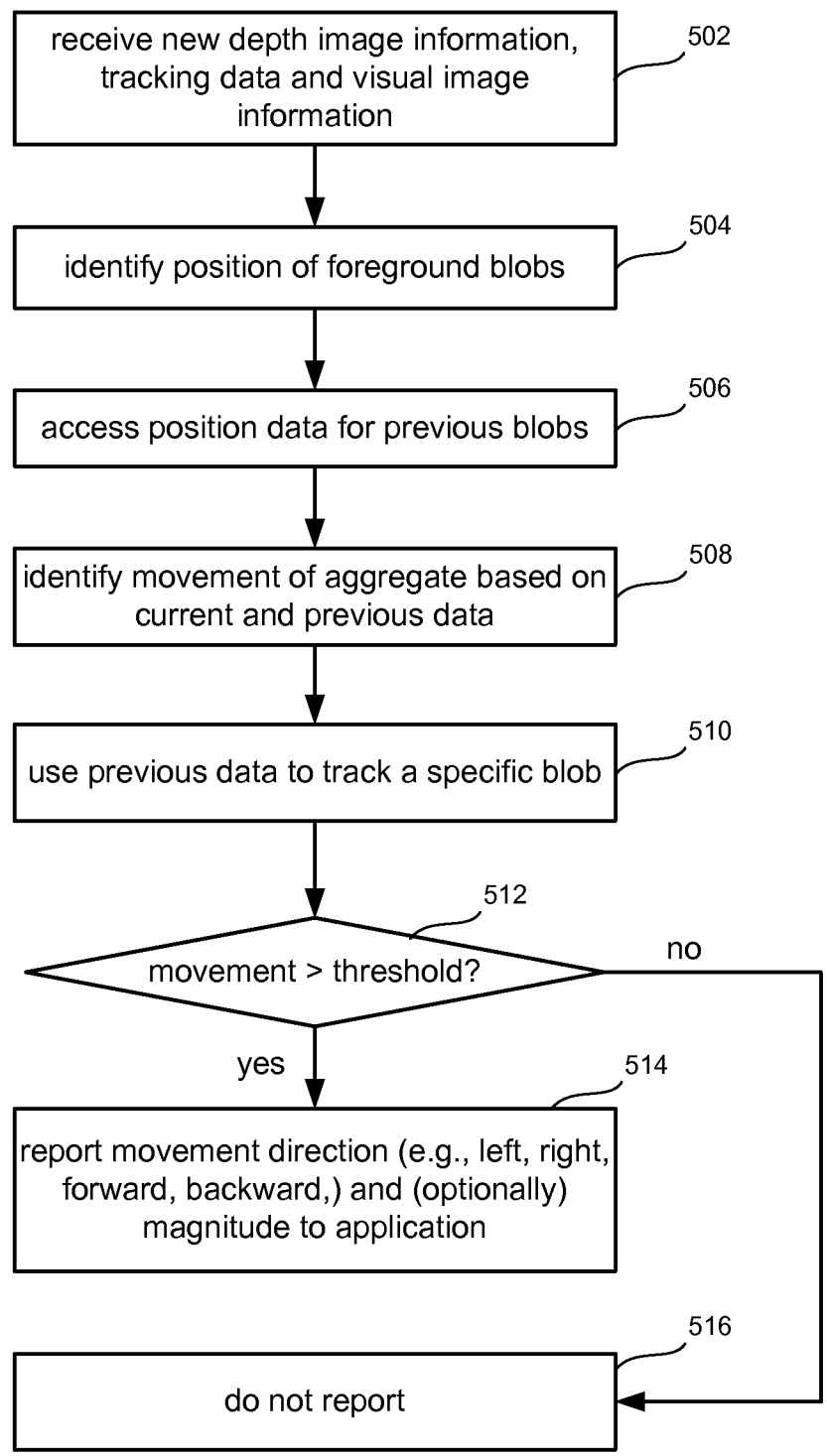
FIG. 8 is a flow chart describing one embodiment of a process for identify an action or condition based on the sensed one or more physical properties.

FIG. 8 is a flow chart describing the operation of a filter that detects movement of a group of people. In one embodiment, the output of the filter tells application 52 whether a group of people in front of capture device 20 moved to the left, moved to the right, moved forward or moved backward. In some embodiments, the filter will also provide an indication of the magnitude of the movement. In step 502, the filter will receive new depth image information, tracking data and visual image information. In other embodiments, a subset of that information will be provided to the filter. For example, the filter can operate only on depth image information, only on tracking data, only on visual images, or two of the three. In step 504, the filter will identify the position of foreground blobs. For example, using known techniques in the art, the system can distinguish between foreground and background pixels in either the depth image or visual image. One example is to subtract successive images. Blobs that are moving are foreground pixels and assumed to be persons in front of capture device 20. In step 506, the filter will access position data for previous blobs and previous iterations of the process of FIG. 8. In step 508, the filter will identify movement of the aggregate group based on the current and previous data. Thus, the system will look in the history of images and determine whether the aggregate set of blobs are moving to the left, the right, forward and/or backward.

In step 510 (optional), the system will attempt to identify a specific blob for a specific person. This is contrasted to the previous steps that looked at the aggregate of blobs and determined whether the aggregate of blobs are moving in a particular direction. If there is one person in the room moving in a different direction than the rest of the group, that person will be identified in step 510 and previous data will be associated with that blob in order to determine the direction that person is moving.

In step 512, it is determined whether the movement of the group (or a specific person) is greater than a threshold. The threshold can be set based on the requirements of the application, or based on experimentation. If the movement is greater than a threshold, then the movement is reported in step 514. In one implementation, the filter will report whether the aggregate group moved to the left, moved to the right, moved forward, or moved backward. Optionally, the filter can report the magnitude of the movement. Additionally (and optionally), the system will report whether a specific person moved in a different direction than the rest of the group. If, in step 512, it is determined that the movement was not greater than a threshold amount of movement, then the filter will not report anything to application 52.

In another alternative, the system will use separate filters for each of the possible directions of movement. For example, there will be one filter that will attempt to detect movement to the left, a second filter for detecting movement to the right, a third filter for detecting movement toward the camera, and a fourth filter for detecting movement away from the camera. Each of those filters will operate as described by the flow chart of FIG. 8, except that the identification of movement in step 508 will only be in the single direction for that filter and the reporting at step 514 will only be for the specific direction associated with that filter.

Figure 9:
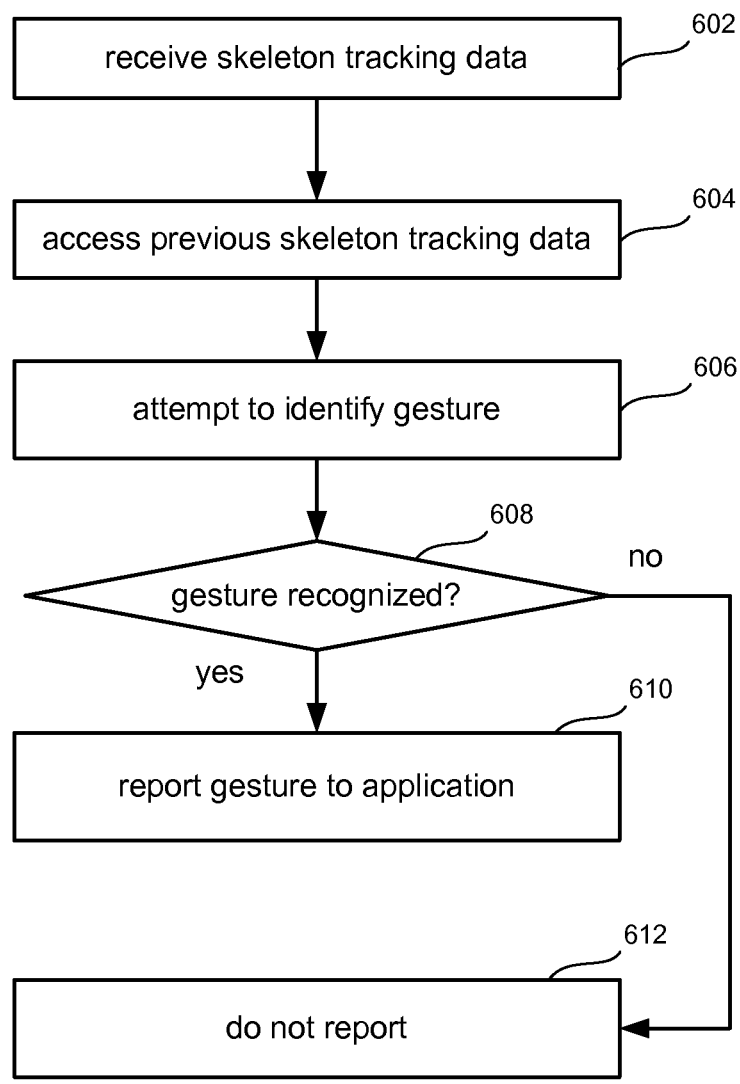
FIG. 9 is a flow chart describing one embodiment of a process for identify an action or condition based on the sensed one or more physical properties.

In addition to tracking movement, filters can be used to identify specific gestures. For example, if multiple people in a group raise their hands up in the air, that can trigger an action in a video game. Alternatively, if multiple people in the background stand up in a certain order, that can trigger the fans in a video baseball game (or other sporting event) performing the wave in a stadium (standing up in sequence). In one embodiment, the system can have several filters for tracking several gestures, with each filter attempting to identify a different gesture. FIG. 9 depicts a flow chart describing one embodiment for operation a filter that identifies a specific gesture. In step 602 of FIG. 9, the filter will receive skeleton tracking data from depth image processing and skeleton tracking 50, as described above. In step 604, the filter will access previous tracking data. In step 606, the filter will attempt to identify the gesture associated with that particular filter. In step 608, it is determined whether the gesture was recognized. If the gesture was recognized, then in step 610 the gesture is reported to application 52. If the gesture was not recognized, then the filter will not report to application 52 (step 612).

In one embodiment, every time a depth image is provided from capture device 20, depth image processing and skeleton tracking 50 will update the skeleton tracking and provide the skeleton tracking data to the filter performing the process of FIG. 9. Each time the filter receives that skeleton tracking data, the process of FIG. 9 will be started. Note that more information about gestures can be found in the following three patent applications that are incorporated by reference herein in their entirety: U.S. patent application Ser. No.

12/475,208, "Gestures Beyond Skeletal," filed on May 29, 2009; U.S. patent application Ser. No. 12/391,150, "Standard Gestures," filed on Feb. 23, 2009; and U.S. patent application Ser. No. 12/474,655, "Gesture Tool" filed on May 29, 2009.

FIG. 10 is a flow chart describing one embodiment of a filter that determines whether the brightness level in the room has changed. For example, application 52 can use that change of brightness to change the brightness, font size or other property of application 52. In step 652, the filter will receive a visual image from recognizer engine 54. In step 654, the filter will access a previous set of visual images received. In step 656, the filter will compare the brightness of the current visual image to the previous visual images to see if there is a change in brightness. If the change in brightness is greater than a threshold (step 658), then the filter reports the change in brightness to application 52. In one embodiment, the filter will report whether the visual image is brighter or dimmer than the previous images. If the change in brightness is not greater than a threshold, then the filter will not report to application 52 (step 662).

FIG. 11 is a flow chart describing one embodiment of a process performed by a filter that determines whether certain sounds were made in the room. If such sounds are detected, application 52 may change the sounds in a video game (increase or decrease background noise/cheering), change the physical abilities of the avatar playing an event in the video game, perform a command in a productivity software program, etc. In step 682 of FIG. 11, the filter receives the sound data from recognizer engine 54. In step 684, the filter accesses previous sound data. In step 686, the filter compares the volume of the current sound data to the volume of previous sound data. If the difference in volume is greater than a threshold (step 688), then that change in volume will be reported to the application 52 in step 690. If the change in volume is not greater than the threshold, then the filter will not report to application 52 (step 692).

In an alternative embodiment, instead of trying to identify whether the volume has changed by a threshold, the filter can detect whether a certain sound (e.g. predetermined range of pitch or predetermined range of tone) occurred and report based on detecting the predetermined sound.

In another embodiment, a filter can detect whether one or more persons in front of capture device 20 (including persons bound to the game and persons not bound and not actively engaged in the game) have experienced a predefined emotion. If it is detected that one or more persons have exhibited that predefined emotion, the application can change one or more properties such as increase the cheering of the crowd in the background of a video game, change the emotion of an avatar, undo a change made to a word processing program, etc.

Figure 12:
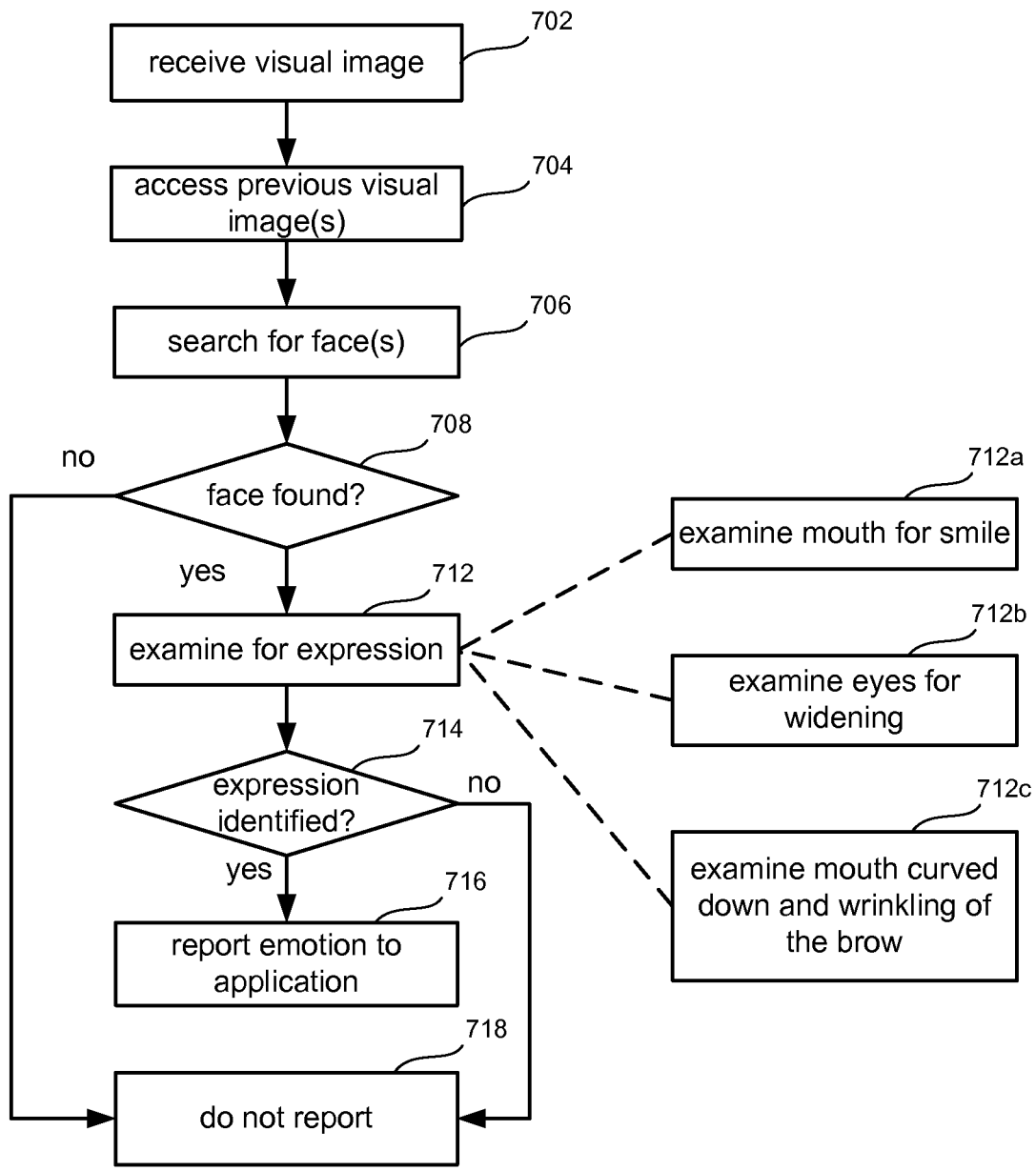
FIG. 12 is a flow chart describing one embodiment of a process for identify an action or condition based on the sensed one or more physical properties.

FIG. 12 depicts a flow chart describing one embodiment of a process performed by a filter to detect and report about emotion. In step 702 of FIG. 12, the filter will receive a visual image. In step 704, the system will access previous visual images. In step 706, the filter will search for faces in the visual images from steps 702 and 704. There are many processes for searching for faces known in the art, many of which are suitable for this implementation. In step 708, it is determined whether a face was found in the current image and a sufficient number of the previous images. If no face was found in the current visual image and/or enough of the previous visual images, then the system will abort and not report anything (step 710). If a face is found in the current visual image and sufficient number of previous images, then in step 712, the filter will examine the faces for an expression. There are many expressions that a filter can look for. FIG. 12 provides three examples. In the first example, step 712A, the system can examine the mouth to look for a smile. In the second example, step 712B, the system will examine the eyes for widening. In the third example, step 712C, the filter will examine a mouth for a curvature downward and a wrinkling of the brow (e.g., indicating frown). In one embodiment, the system will look for all three expressions. In another embodiment, each filter will only look for one expression. In other embodiments, other expressions could be identified. Each of the expressions corresponds to an emotion. For example, a smile corresponds to happy, eyes widening corresponds to surprise, and a frown corresponds to being unhappy. If an expression is identified (step 714), then that corresponding emotion is reported to the application in step 716. If an expression is not identified (step 714), then nothing is reported to the application 52 (step 718). In another embodiment, there can be separate filters for each motion being searched for.

Using the above techniques, the system will use depth images, visual images and/or audio information in order to observe and identify various actions, gestures or conditions in a room housing capture device 20. In this manner, one or more persons who are not actively engaged and interacting with an application will have their actions or gestures cause a change to the application; thereby, providing those people not otherwise actively engaged with the application (e.g. video game) with greater interest in what is happening.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A method for interacting with a computer based application, comprising:

using a sensor system to automatically track motion of limbs of one or more users actively engaged with the computer based application;

based at least in part on the automatically tracking motion of limbs of one or more users actively engaged with the computer based application, automatically determining that the one or more users actively engaged with the computer based application have performed a first predetermined motion;

performing the computer based application including performing a first action in the computer based application based at least in part on the determining that the one or more users actively engaged with the computer based application have performed the first predetermined motion;

using the sensor system to automatically track motion of limbs of one or more entities not actively engaged with the computer based application;

based at least in part on the automatically tracking motion of limbs of one or more entities not actively engaged with the computer based application, automatically determining that the one or more entities not actively engaged with the computer based application have performed a second predetermined motion, the first predetermined motion is a different type of gesture than the second predetermined motion;

performing a second action in the computer based application based at least in part on the determining that the one or more entities not actively engaged with the computer based application have performed the second predetermined motion, the second action is a different type of action than the first action; and automatically reporting the first action and the second action in a user interface of the computer based application.

2. The method of claim 1, wherein:

the using the sensor system to automatically track motion of limbs of one or more entities not actively engaged with the computer based application includes sensing a two dimensional depth image with pixels having magnitudes that represent distance;

the second predetermined motion is a gesture that involves motion; and the determining that the one or more entities not actively engaged with the computer based application have performed the second predetermined motion includes using the depth image to identify the gesture.

3. The method of claim 1, wherein:

using the sensor system to automatically track motion of limbs of one or more entities not actively engaged with the computer based application includes sensing a two dimensional depth image with pixels having magnitudes that represent distance and sensing a visual image;

the second predetermined motion is a gesture that involves motion; and the determining that the one or more entities not actively engaged with the computer based application have performed the second predetermined motion includes using the depth image and the visual image to identify the gesture.

4. The method of claim 1, wherein:

the computer based application is a video game; and the performing the second action includes changing an appearance of an item in the video game.

5. The method of claim 1, wherein:

the computer based application is a video game; and the performing the second action includes changing the score of the video game.

6. The method of claim 1, further comprising:

detecting an emotion of the one or more entities not actively engaged with the computer based application based at least in part on facial expression using the sensor system, the performing the second action is performed in response to detecting the emotion.

7. The method of claim 1, wherein:

the determining that the one or more entities not actively engaged with the computer based application have performed a second predetermined motion comprises identifying an action performed as a group.

8. One or more processor readable hardware storage devices having processor readable code embodied on the one or more processor readable hardware storage devices, the processor readable code for programming one or more processors to perform a method comprising:

performing a video game including interacting with one or more users who are bound to the video game;

receiving information from a first sensor about moving objects, the moving objects include the one or more bound users and one or more persons who are not bound to the video game;

during the video game, automatically tracking and characterizing motion of the one or more bound users and the one or more persons who are not bound to the video game based at least in part on the information from the first sensor including recognizing different types of motion being performed by the one or more bound users as compared to the one or more persons who are not bound to the video game, the tracking and characterizing motion of the one or more bound users includes skeletal tracking using one or more models of the bodies of the one or more bound users, the tracking and characterizing motion of the one or more persons who are not bound to the video game includes skeletal tracking using one or more models of the bodies of the one or more persons who are not bound to the video game; and automatically changing the computer based video game in response to the tracked and characterized motion of the one or more bound users and one or more persons who are not bound to the video game.

9. The one or more processor readable hardware storage devices of claim 8, wherein:

the receiving information from a first sensor includes receiving a two dimensional depth image with pixels having magnitudes that represent distance; and automatically tracking and characterizing motion includes recognizing a gesture using the depth image.

10. The one or more processor readable hardware storage devices of claim 8, wherein the method further comprises:

receiving sound information from a second sensor, the sound information is from the one or more persons who are not bound to the computer based video game, the changing the video game in performed partially in response to the sound information.

11. The one or more processor readable hardware storage devices of claim 8, wherein:

the changing the video game includes moving an item in the video game in response to motion of the one or more persons who are not bound to the video game.

12. The one or more processor readable hardware storage devices of claim 8, wherein:

the automatically tracking and characterizing motion comprises identifying an action performed as a group.

13. The one or more processor readable hardware storage devices of claim 8, wherein:

the receiving information from a first sensor about moving objects includes sensing motion of a group;

the automatically tracking and characterizing motion includes identifying an action of an individual of the group;

the changing the video game is performed based on the action of the individual.

14. The one or more processor readable hardware storage devices of claim 8, wherein:

the tracking and characterizing motion of the one or more persons who are not bound to the video game includes skeletal tracking to track motion of limbs of the one or more persons who are not bound to the video game.

15. The one or more processor readable hardware storage devices of claim 8, wherein the method further comprises:

using the information from the first sensor to detect an emotion of the one or more persons who are not bound to the video game based on facial expression, the automatically changing the computer based video game is performed in response to detecting the emotion.

16. A computing system, comprising:

a camera; and a computer connected to the camera, the computer includes:

a tracking engine to receive data from the camera, the tracking engine operable to provide output information indicative of tracking, a software application for communication with the tracking engine, the software application operable to interact with one or more actively engaged users based on the output information from the tracking engine and operable to interact with one or more entities not actively engaged with the software application, the tracking engine operable to track motion of limbs of the one or more entities not actively engaged with the software application, the output information includes information about the tracked motion of limbs of the one or more entities not actively engaged with the software application, a recognizer engine to receive data from the camera and the output information from the tracking engine, and a plurality of filters, the recognizer engine operable to selectively provide the data from the camera and output information from the tracking engine to one or more of the filters as input data, each filter of the plurality of filters configured to test for a different predetermined motion and configured to output to the software application whether one or more entities not actively engaged with the software application have performed the respective predetermined motion based on the tracking of motion of limbs of the one or more entities not actively engaged with the software application, the software application operable to make a change to a runtime condition reported in a user interface of the software application in response to one or more of the filters indicating that one or more entities not actively engaged with the software application have performed a predetermined action.

17. The computing system of claim 16, wherein:
the camera includes a depth sensor; and
the data from the camera includes a depth image.

18. The computing system of claim 17, wherein:
the software application is a video game; and
the change to the runtime condition is a movement of an object in response to movement of one or more entities not actively engaged with the video game.

19. The computing system of claim 16, wherein:
the software application is a video game; and
each filter of the plurality of the plurality of filters is configured to determine and output to the video game whether one or more entities not actively engaged with the software application have performed a different gesture that involves motion.

20. The computing system of claim 16, wherein:
the software application is a video game; and
one particular filter of the plurality of the plurality of filters is configured to determine and output to the video game whether a group has performed a predetermined motion as an aggregate, the group including the entities not actively engaged with the software application and the one or more actively engaged users.

* * * * *